United States Patent
Håland et al.

(10) Patent No.: US 7,488,373 B2
(45) Date of Patent: Feb. 10, 2009

(54) DEVICE AND METHOD FOR TREATING A GAS/LIQUID MIXTURE

(75) Inventors: Trygve Håland, Tananger (NO); Per-Reidar Larnholm, Moss (NO)

(73) Assignee: Statoil ASA, Stavanger (NO)

( * ) Notice: Subject to any disclaimer, the term of this patent is extended or adjusted under 35 U.S.C. 154(b) by 547 days.

(21) Appl. No.: 10/506,791

(22) PCT Filed: Mar. 5, 2003

(86) PCT No.: PCT/EP03/02303

§ 371 (c)(1), (2), (4) Date: May 19, 2005

(87) PCT Pub. No.: WO03/074156

PCT Pub. Date: Sep. 12, 2003

(65) Prior Publication Data

US 2005/0204917 A1 Sep. 22, 2005

(30) Foreign Application Priority Data

Mar. 5, 2002 (NL) .................................. 1020113

(51) Int. Cl.
*B01D 50/00* (2006.01)
(52) U.S. Cl. .............. 95/268; 95/269; 55/327; 55/337; 55/346; 55/348; 55/428; 55/524
(58) Field of Classification Search ........... 55/318, 55/320, 319, 327, 337, 346, 348, 525, 428, 55/524; 95/268, 269

See application file for complete search history.

(56) References Cited

U.S. PATENT DOCUMENTS

| 2,521,785 | A | * | 9/1950 | Goodloe ............. 55/482 |
| 3,010,537 | A | | 11/1961 | Baker et al. |
| 4,767,424 | A | * | 8/1988 | McEwan ............. 55/329 |
| 6,251,168 | B1 | | 6/2001 | Birmingham et al. |

FOREIGN PATENT DOCUMENTS

| DE | 257 826 A | 6/1988 |
| EP | 0 195 464 B1 | 9/1986 |
| WO | WO 00 74815 A | 12/2000 |

* cited by examiner

*Primary Examiner*—Robert A Hopkins
(74) *Attorney, Agent, or Firm*—Harness, Dickey & Pierce P.L.C.

(57) ABSTRACT

The present invention relates to a device for treating a gas/liquid mixture, comprising: —an upright vessel (1) with a lower and upper compartment; —an inlet (2) for admitting the flow of mixture into the lower compartment; —an agglomerating unit (10) placed between the lower and upper compartment for enlarging the liquid droplets in the mixture; —a lower outlet (4) for discharging the substantially liquid-containing mixture part from the lower compartment; —an upper outlet (5) for discharging the substantially gas-containing mixture part from the upper compartment; characterized by —collecting means (11) for collecting on the downstream side of the agglomerating unit liquid droplets which have broken through the agglomerating unit; —recycling means (12) for recycling the collected liquid to the lower compartment from the collecting means.

30 Claims, 5 Drawing Sheets

DEVICE AND METHOD FOR TREATING A GAS/LIQUID MIXTURE

The present invention relates to a device and method for treating a gas/liquid mixture, and in particular to the separation of mixtures of oil, water and/or gas.

In the oil and gas industry separators are known for separating the supplied mixture of liquid (oil and/or water) and gas into a stream of substantially gas and a stream of substantially liquid. Different separators are known for separating such gas/liquid mixtures.

Known from EP 0 195 464 A1 is a separator consisting of an upright column (upright vessel), a lower part of which is separated from an upper part by a "demister" or "coalescer" of a mesh of wires, also referred to as a "mesh pad". The lower part forms a lower compartment into which is fed the gas/liquid mixture for treating, while optionally being pre-treated. During infeed a part of the liquid is already separated from the mixture. This liquid accumulates at the bottom of the lower compartment.

The remaining part of the gas/liquid mixture is then guided through the wire mesh. The liquid droplets in the mixture for guiding through the wire mesh collide with the wires and grow therewith into a liquid layer. If the speed of the supplied gas/liquid mixture is sufficiently low, the liquid from the liquid layer will drop back under the influence of the force of gravity into the lower compartment and fall into the liquid already present there. A discharge is connected to the lower compartment for draining liquid, while in the upper compartment a discharge is connected for draining the gas/liquid mixture remaining after the demister.

The known demisters have a relatively small pressure drop and a high separating efficiency, wherein the very small liquid droplets can also be separated from the gas. At relatively low gas velocities the liquid removed from the gas showers downward from the demister under the influence of gravity. At higher gas velocities some of the liquid droplets are entrained by the upward flowing gas and carried along in upward direction from the demister. However, because a liquid layer is created on top of the demister at higher gas velocities, flooding limits the maximum flow rate of the demister in the standard configuration. At a determined liquid and gas load the mesh will break through, which means that the mesh becomes supersaturated with liquid and a part of the liquid penetrates through the mesh and flows upward on the downstream side of the mesh. Such a breakthrough results in the separation of liquid from the gas/liquid mixture being impeded.

In light of the foregoing, the processing capacity of the conventional demister remains limited, and a demister suitable for a determined processing capacity is relatively large.

It is an object of the present invention to obviate at least one of the above stated drawbacks and other drawbacks associated with the prior art separators, and to provide an improved method and device wherein the liquid treatment capacity as well as the gas treatment capacity can be considerably increased.

According to a first aspect, the present invention relates to a device for treating a gas/liquid mixture, comprising:

an upright vessel with a lower and upper compartment;

an inlet for admitting the flow of mixture into the lower compartment;

an agglomerating unit placed between the lower and upper compartment for enlarging the liquid droplets in the mixture;

collecting means for collecting on the downstream side of the agglomerating unit liquid droplets which have broken through the agglomerating unit;

recycling means for recycling the collected liquid to the lower compartment from the collecting means;

a lower outlet for discharging the substantially liquid-containing mixture part from the lower compartment;

an upper outlet for discharging the substantially gas-containing mixture part from the upper compartment.

The agglomerating unit causes agglomeration of the liquid, i.e. collecting or accumulating of the liquid in relatively large liquid droplets. The agglomerating unit is preferably embodied in a mesh, for instance in the form of a number of layers of metal gauze. Other types of agglomerating units can however also be applied, such as one or more layers of structured packing or of vanes or vane packs. Any porous medium with a porosity of 80 to 99.9% is in fact suitable. The mesh according to the invention is designed to function in a flooded condition. The liquid permeating through the mesh as a result of supersaturation forms a bubbling mass above the downstream agglomerating unit surface. In order to prevent too much liquid collecting above the agglomerating unit surface and the distribution of the liquid displacing to the further separator still being adversely affected, the liquid is discharged via the collecting means and recycling means. The determining factor for the separating capacity is now no longer the saturation point of the mesh, but the (larger) capacity of the collecting and discharging means.

There will moreover be an increase in the total separating efficiency, i.e. the efficiency of the agglomerating unit in combination with an optional separator arranged downstream. The agglomerating unit has the result that the dimensions of the downstream liquid droplet are enlarged, which increases the separating efficiency of an optional downstream separator such as a cyclone separator. The agglomerating unit will moreover equalize a possibly irregular distribution on the upstream surface of the mesh, which increases the separating efficiency of the downstream cyclone separator.

In a preferred embodiment of the invention the device comprises a separator arranged in the upper compartment downstream of the agglomerating unit for further separating the mixture into a substantially liquid-containing mixture part and a substantially gas-containing mixture part. The separator preferably comprises one or more cyclone separators, wherein the inflowing mixture is set into a rotating movement, whereby a heavy fraction, in which a relatively large amount of liquid is present, is flung against the outer wall of the cyclone and is discharged via openings in the side wall.

In a particularly advantageous embodiment the separator comprises one or more axial recycle cyclones, the liquid discharge of which extends from the separator to below the liquid level in the lower compartment. Such axial recycle cyclones with very high separation efficiency are known from WO 00/25931, the content of which should be deemed as interpolated herein. Described herein is an installation wherein a number of boxes with cyclones are arranged above the vessel. These cyclones are axial recycle cyclones. The installation comprises a liquid discharge conduit or "downcomer" for carrying the liquid to the underside of the vessel. The outlet nozzle of the liquid discharge conduit has to be situated below the liquid level in order to form a liquid trap and to prevent bypass of gas.

In order to ensure that the breakthrough of liquid through the mesh is uniform, i.e. that the breakthrough occurs all at once and substantially over the whole cross-section of the agglomerating unit, and the distribution of the mixture downstream of the agglomerating unit is distributed uniformly over the cross-section of the vessel, in a further preferred embodiment of the invention the agglomerating unit comprises a substantially horizontally extending layer of mesh and, in an even more preferred embodiment, the agglomerating unit has a substantially constant layer thickness.

In a preferred embodiment the collecting means and the recycling means comprise at least one collecting reservoir extending in the agglomerating unit for collecting the broken-through liquid therein, and one or more discharge conduits extending from the collecting reservoir to below the level of the liquid collected in the lower compartment. The collecting and recycling means are integrated into the mesh. The collecting reservoir or collecting trough with the discharge conduit runs through the mesh, whereby the downstream side of the mesh is connected to the upstream side. The exact geometry of the draining system, for instance the number and the form of the collecting reservoirs and recycle conduits, is determined by the liquid and gas load for processing.

In a further preferred embodiment the inlet is moreover connected to a pre-treatment unit for carrying out a first liquid/gas separation. The effect of the subsequent treatments by the agglomerating unit and the separator unit is hereby increased. A pre-treatment unit can be formed by a device which is placed on the inlet stub of a separating vessel and which is provided with a number of curved blades which uniformly absorb the moment of the incoming gas-liquid flow. The blades then guide the gas-liquid flow laterally into the lower compartment of the separating vessel. As a result of this controlled inflow of the gas-liquid mixture, a first part of the liquid will already be separated whereby the liquid load on the agglomerating unit and separator mounted downstream is considerably reduced.

The pre-treatment unit preferably comprises one or more inlet cyclone separators arranged in the lower compartment. With such a pre-treatment the impact of the inlet flow can be limited, a part of the liquid can already be separated and a more uniform distribution of the mixture flow falling onto the mesh can be brought about, which enhances the overall separating efficiency.

It has been found that for an efficient discharge of the liquid droplet downstream of the agglomerating unit, at a relatively small pressure loss as a result of limiting the through-flow surface area due to the presence of the collecting and discharging means, the collecting means are arranged over about 15% of the cross-section of the vessel.

A characteristic measure for the breakthrough point defined by the breakthrough of the liquid is the so-called K-value. The K-value is proportional to the gas velocity multiplied by the root of the ratio of the gas density to the density difference of gas-liquid. If the K-value is high, the conventional mesh becomes supersaturated and will then no longer function correctly. The K-value is therefore kept low in a conventional mesh. Limitation of the K-value however also entails a limitation of the separating capacity of the device, which in turn results in relatively large separators. While in the known devices breakthrough of the mesh is always prevented by keeping the K-value low, in practice less than about 0.1, it is precisely the case according to the invention that a break through the mesh has to occur. The mesh applied according to the invention is therefore embodied to allow the supplied liquid to break through from a minimum K-value of about 0.1.

Another aspect of the present invention relates to a method for treating a gas/liquid mixture in an upright vessel with a lower and upper compartment, comprising of:
  feeding the gas/liquid flow into the lower compartment of the column;
  guiding the gas/liquid flow through an agglomerating unit arranged between the lower and upper compartment at high speed such that liquid breaks through to a position beyond the downstream surface of the agglomerating unit;
  collecting the broken-through liquid;
  recycling the collected liquid to the lower compartment;
  discharging the mixture from the lower compartment;
  discharging the mixture from the upper compartment.

The breaking of the liquid through a mesh takes place at a K-value of at least 0.1. The supplied gas/liquid mixture must therefore have a K-value of at least 0.1 to bring about a break through the mesh.

An advantageous embodiment of the method further comprises of further separating the mixture in the upper compartment by guiding the mixture through one or more cyclone separators and carrying the separated liquid part to the lower compartment and the separated gas part to the upper outlet, preferably combined with pre-treating the introduced gas/liquid flow for separating a part of the liquid from the gas/liquid mixture.

Further advantages, features and details of the present invention will follow from the description of two preferred embodiments thereof. Reference is made in the description to the figures, in which.

Figure 1:
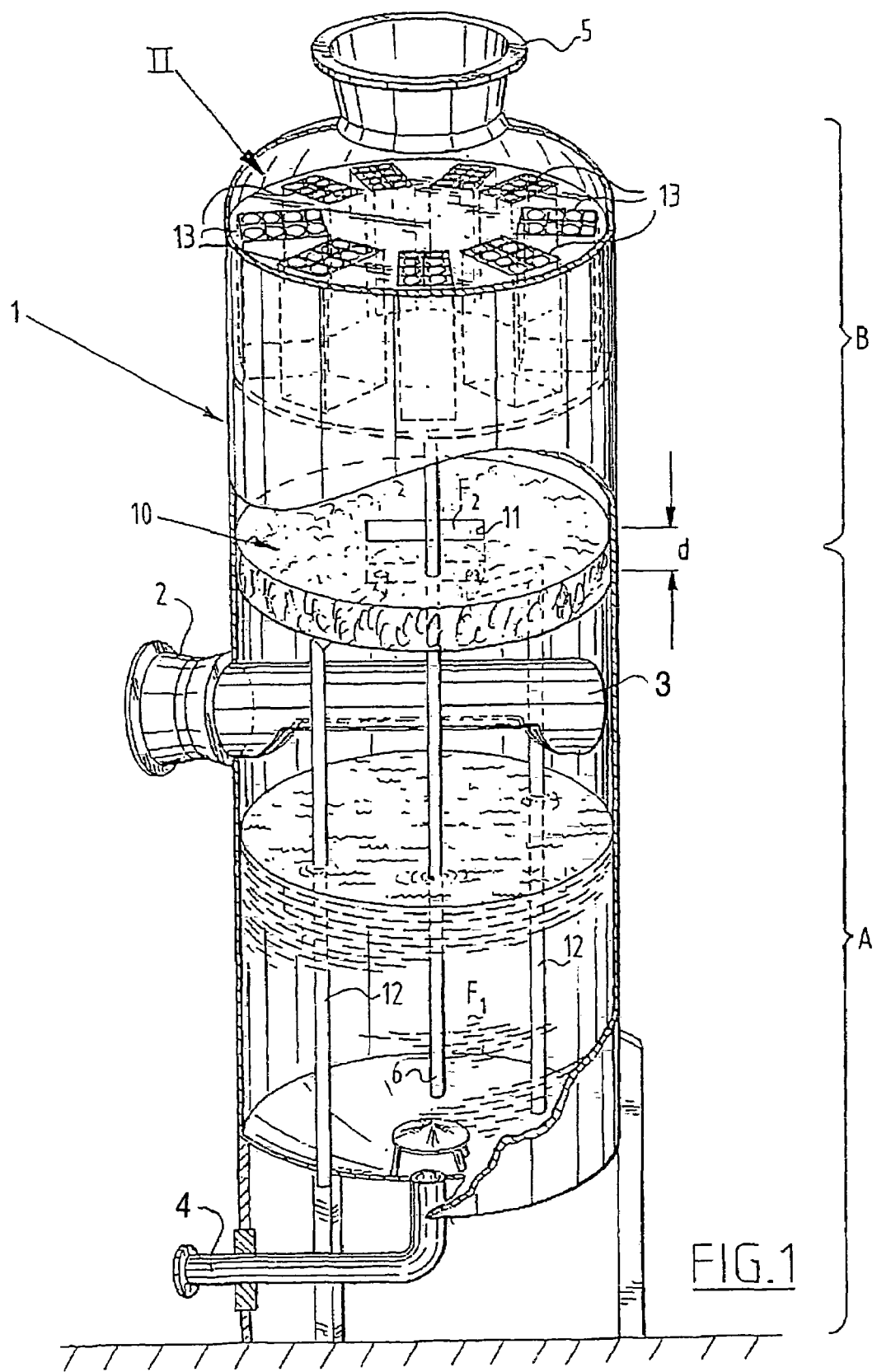
FIG. 1 shows a partly cut-away schematic perspective view of an installation for separating a gas/liquid mixture, wherein a preferred embodiment of the device according to the present invention is applied.

FIG. 1 shows a separating vessel (separating column) 1 for separating a supplied gas/liquid mixture, such as natural gas mixed with (salt sea-)water, into a substantially gas-containing fraction, also referred to as light fraction, and a substantially liquid-containing fraction (water and/or oil), also referred to as heavy fraction. Vessel 1 is provided with a connecting stub 2 for infeed of the gas/liquid mixture, a connecting stub for a liquid discharge conduit 4 for discharge of liquid and a connecting stub 5 for discharge of substantially gas.

Via a pre-treatment unit 3 the introduced gas/liquid mixture is guided to a lower compartment A of vessel 1. In the shown embodiment the pre-treatment unit 3 consists of a tube provided on the underside with an opening. This opening ensures that the supplied mixture is driven under high pressure in the direction of the bottom of the vessel. At the bottom of vessel 1 the liquid $F_1$ is collected and drained via a conduit 4.

In a preferred embodiment (not shown) the pre-treatment unit is formed by a device provided with a number of curved blades which uniformly absorb the moment of the incoming gas/liquid flow. This device is known in the field as the "schoepentoeter" (vane feed inlet). The blades subsequently guide the gas/liquid flow laterally into the lower compartment of the separating vessel. As a result of this controlled entry of the gas/liquid mixture a first part of the liquid will already be separated and accumulate at the bottom of vessel 1. It is however advantageous to embody the pre-treatment unit in the form of one or more inlet cyclones 23. Such inlet cyclones are for instance known from the publication WO 00/74815 A2 of the present applicant, the content of which should be deemed as interpolated herein. In such cyclones the inflowing mixture is set into a rotating movement, whereby the heavy fraction, in which a relatively large amount of liquid is present, is flung against the outer wall of the cyclone and comes to lie at the bottom of separating vessel 1, and whereby the light fraction, in which a relatively large amount of gas is present, is guided upward.

The separated part of the mixture which, although it contains less liquid than the mixture supplied from outside, still has a considerable liquid content, is then guided at high speed through a layer of tightly packed wires, also referred to as a wire mesh 10. This mesh 10 is disposed horizontally in vessel 1 and thereby forms a separation between lower compartment A and upper compartment B of vessel 1.

Figure 2:
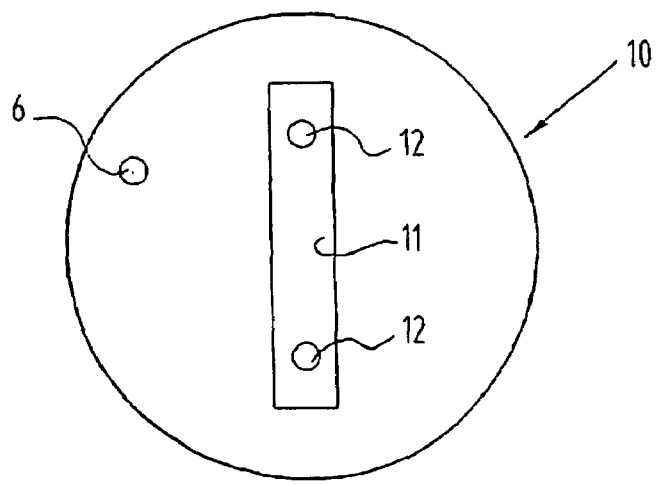
FIG. 2 shows a top view in detail of the preferred embodiment of FIG. 1.

A detailed top view of such a wire mesh 10 is shown in FIG. 2. Provided in the upper surface of mesh 10 is a collecting trough or collecting reservoir 11 in which liquid $F_1$ can be collected. Via two discharge conduits 12 extending below the level of liquid $F_1$ at the bottom of the lower compartment, the collected liquid $F_1$ can be carried to the lower compartment A of vessel 1, where the liquid can be drained via discharge conduit 4.

The mesh according to the invention is designed to function in a flooded condition This means that the velocity of the supplied mixture is so high that the liquid from the mixture breaks through the mesh and forms a bubbling mass above the mesh surface.

The breaking of the liquid through the mesh is dependent on a number of parameters, such as the velocity of the supplied gas, the density of the gas and the density of the liquid. A characteristic measure known in the field for breaking through a mesh is the K-value. The K-value is proportional to the gas velocity multiplied by the root of the ratio of the gas density to the density difference of gas-liquid.

Figure 4:
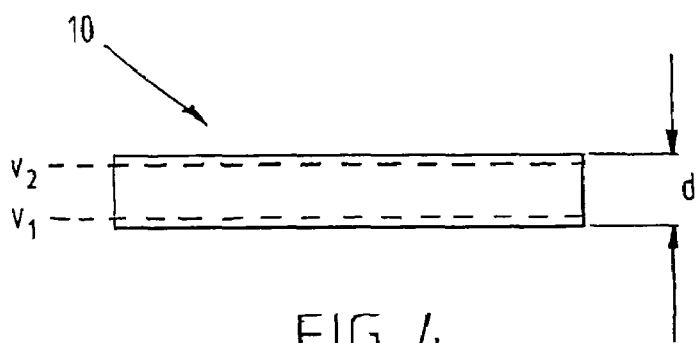
FIG. 4 shows a cross-section through a mesh according to the invention.

At an increasing velocity of the mixture the liquid saturating plane will displace increasingly further upward (for instance from a position $v_1$ to a position $v_2$, FIG. 4). The mesh is disposed horizontally and moreover has a practically constant thickness d (between 100 and 200 mm) to ensure that the saturating plane extends substantially parallel to the outer surface of the mesh. Once the saturating plane has reached the upper surface of the mesh and a breakthrough occurs, the breakthrough will thereby take place uniformly over the whole upper surface. In the case of a varying thickness or a non-horizontal arrangement, breakthrough would only occur on a limited part of the upper surface, while no breakthrough would take place at the position of the remaining part. Such a partial breakthrough results in an irregular distribution of the mixture downstream of the mesh, which has a negative effect on the separation efficiency of the separator disposed downstream.

It has been found that if the K-value is greater than about 0.1, breakthrough will occur. In order to now prevent too much liquid accumulating above the mesh surface and the distribution of the mixture displacing upward downstream still being adversely affected, the liquid is collected via the above mentioned collecting reservoir 11 and carried via discharge conduits 32 to the lower compartment A.

Figure 5:
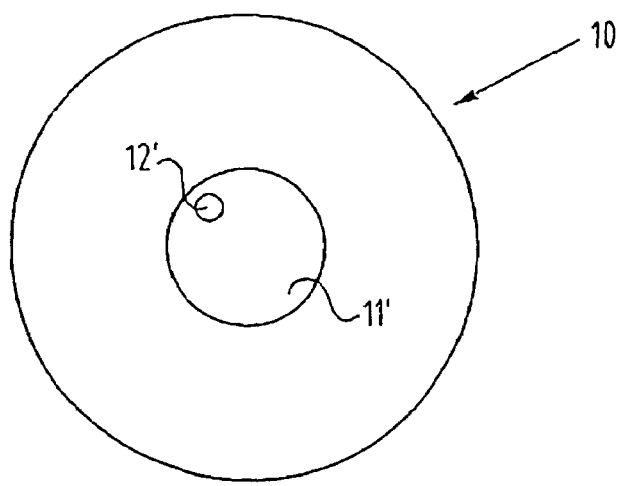
FIG. 5 is a top view of a further embodiment of a mesh according to the invention.
Figure 3:
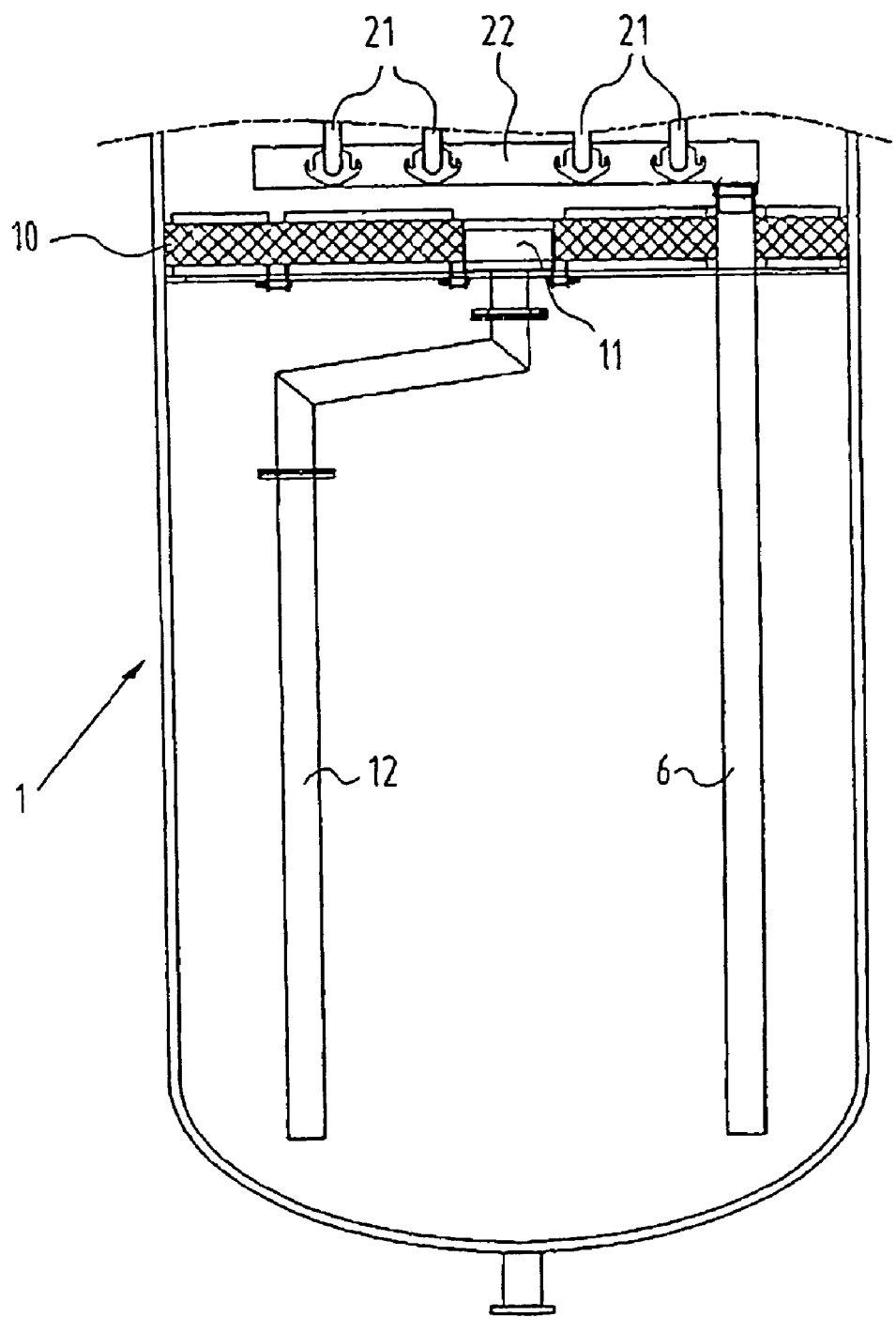
FIG. 3 shows a longitudinal section of the installation of FIG. 1.

Shown in FIG. 5 is another preferred embodiment in which the collecting trough 11' is placed centrally in the middle of the mesh pad, and only one discharge conduit 12' is provided for draining liquid. For an optimal agglomerating action of mesh pad 10 the cross-sectional surface area of collecting trough 11, 11' relative to the cross-sectional surface area of mesh pad 10 should be between 5% and 25%, and preferably around 15%.

The mixture which is displaced further upward, in which mixture a relatively large amount of gas and liquid is present in relatively large droplets, is further separated by a number of cyclone separators. A number of boxes 13 is arranged for this purpose in upper compartment B of vessel 1 (FIG. 1) Provided downstream thereof is the connecting stub 5 for discharging the gas which is dried to a considerable extent. Boxes 13 are each separately or jointly provided with a downcomer 6 which is in communication with liquid $F_1$ at the bottom of the vessel for draining liquid from each of the boxes.

Figure 6:
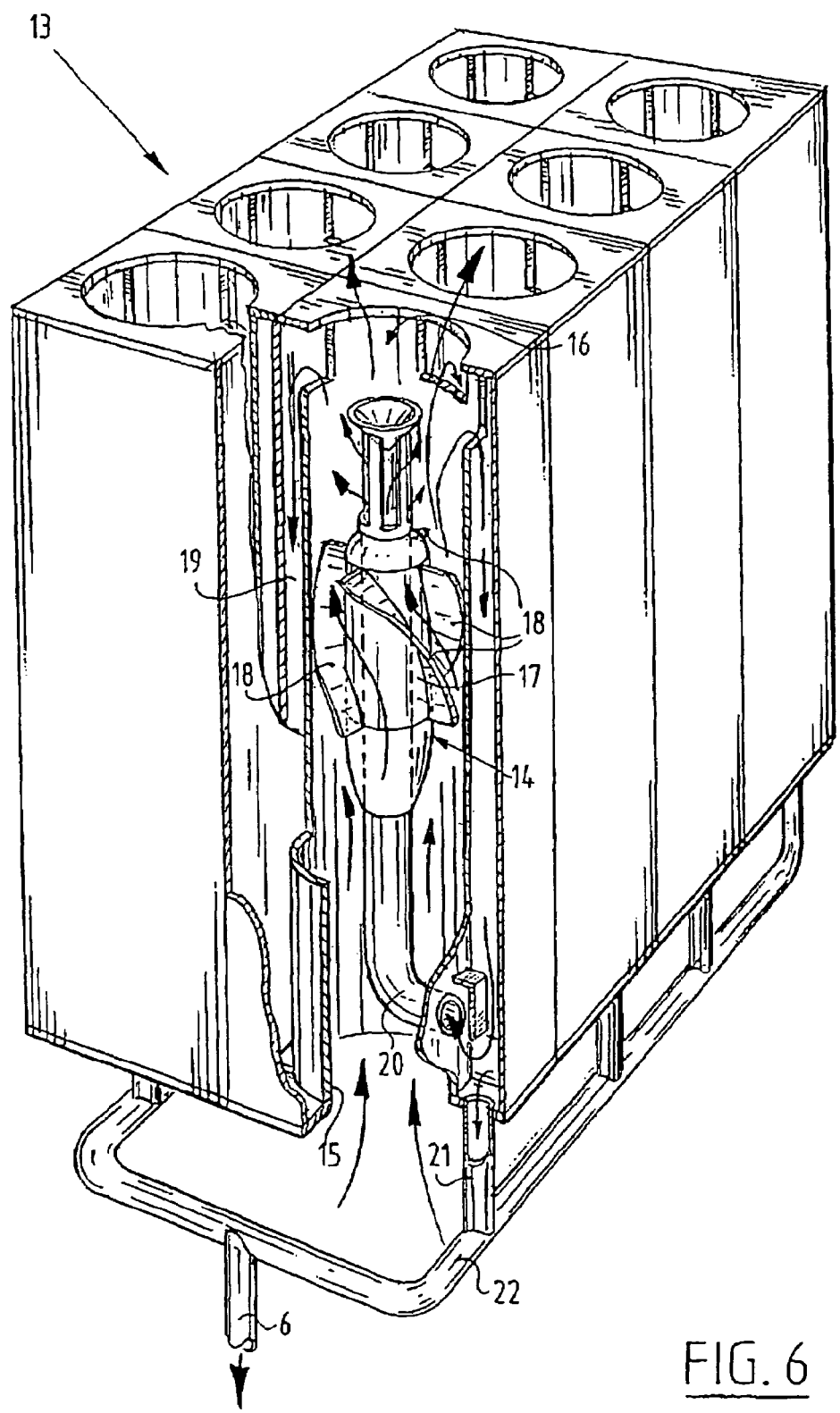
FIG. 6 is a partly cut-away perspective view of detail II of FIG. 1.
Figure 7:
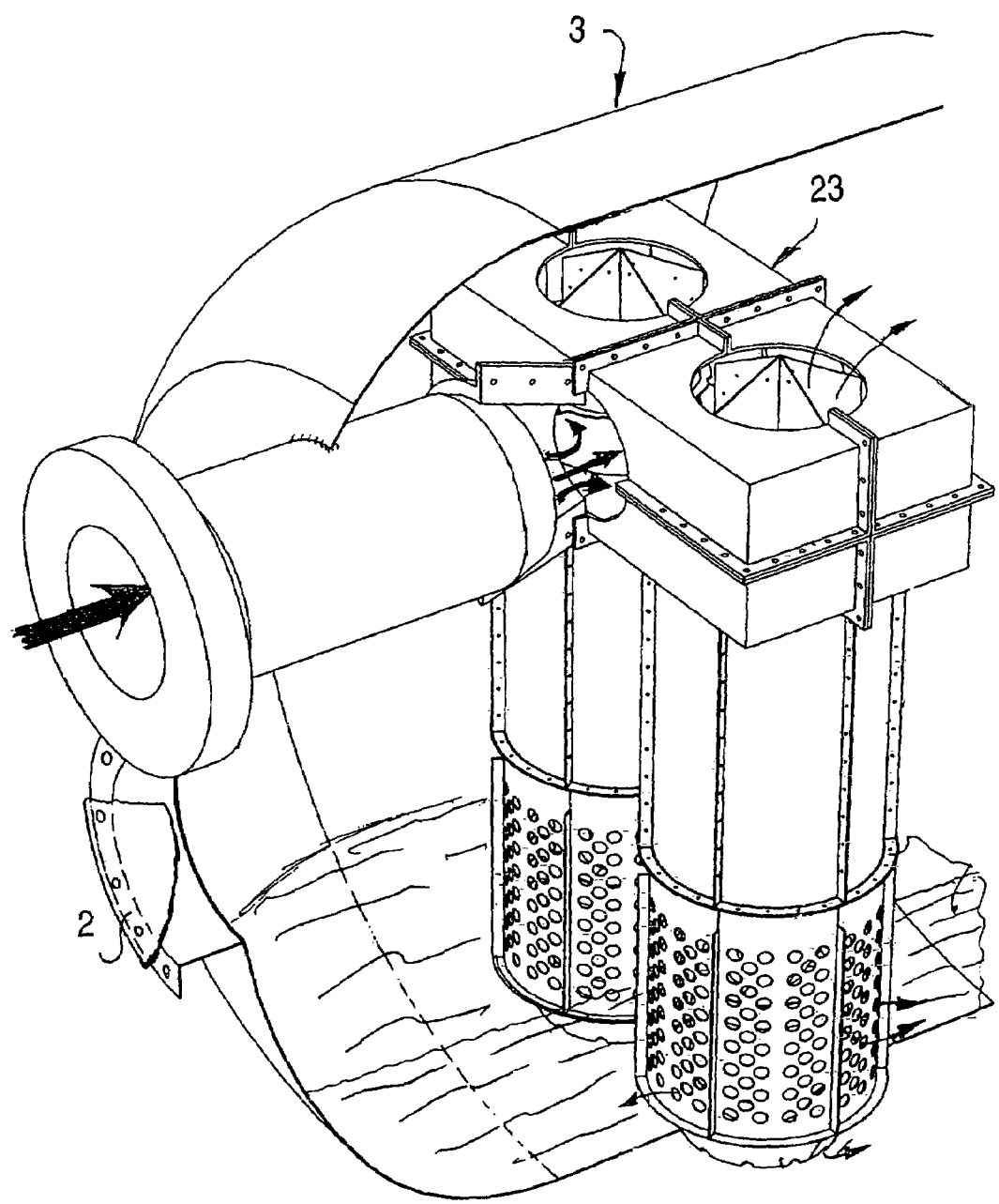
FIG. 7 shows a pre-treatment unit having an inlet cyclone separator.

Eight cyclones 14 are arranged in each of the boxes 13. In a particularly effective embodiment these are axial recycle cyclones. FIG. 6, which is particularly the same as FIG. 2 of the aforementioned document WO 00/25931, shows a box 13 provided with a number of cyclones. A cyclone comprises a cylindrical wall 15 which forms on the underside an inlet for the gas/liquid mixture and has an outflow opening 16 on the upper side thereof. Roughly centrally in the space enclosed by the cylindrical wall is placed a so-called swirl element 17 which is provided with blades 18 for setting the mixture into rotating movement. A part of the mixture is flung outward by this rotating movement and transported via an interspace 19 to a recycle conduit 20. Recycle conduit 20 extends through swirl-element 17. Further connected to the space between wall 15 and the wall of the box is a conduit 21 for draining liquid, which conduit debouches onto a ring line 22 into which drain conduits of other cyclones debouch on one side and downcomer 6 is connected on the other side to the space at the bottom of the vessel for collecting liquid F. The separation efficiency of the type or axial recycle cyclone in combination with mesh 10 described herein has been found to be particularly high, which enables among other things a compact embodiment of the installation.

The present invention is not limited to the above described embodiments thereof; the rights sought are defined by the following claims, within the scope of which many modifications can be envisaged.

The invention claimed is:

1. Device for treating a gas/liquid mixture, comprising:
   an upright vessel with a lower and upper compartment;
   an inlet for admitting the flow of mixture into the lower compartment;
   an agglomerating unit placed between the lower and upper compartment for enlarging the liquid droplets in the mixture;
   a separator arranged in the upper compartment downstream of the agglomerating unit for further separating the mixture into a substantially liquid-containing mixture part and a substantially gas-containing mixture part;
   a lower outlet for discharging the substantially liquid-containing mixture part from the lower compartment;
   an upper outlet for discharging the substantially gas-containing mixture part from the upper compartment;
   collecting means for collecting in or downstream the agglomerating unit the liquid droplets which have broken through the agglomerating unit; and
   recycling means for recycling the collected liquid from the collecting means to the lower compartment.

2. Device according to the claim 1, wherein the agglomerating unit comprises a wire mesh.

3. Device as claimed in claim 1, wherein the collecting means comprise at least one collecting reservoir extending in the agglomerating unit for collecting the broken-through liquid therein, and wherein recycling means comprise a discharge conduit extending from the collecting reservoir to below the level of the liquid collected in the lower compartment.

4. Device as claimed in claim 1, wherein the collecting means are arranged over substantially 15% of the cross-section of the vessel.

5. Device as claimed in claim 2, wherein the mesh is embodied to allow the supplied liquid to break through from a minimum K-value of about 0.1.

6. Device as claimed in claim 1, wherein the agglomerating unit extends substantially horizontally.

7. Device as claimed in claim 1, wherein the agglomerating unit extends over substantially an entire cross-section of the upright vessel.

8. Device as claimed in claim 1, wherein the agglomerating unit has a substantially constant thickness.

9. Device as claimed in claim 1, wherein the separator comprises one or more cyclone separators.

10. Device as claimed in claim 1, wherein the separator comprises one or more axial recycle cyclones, the liquid discharge of which extends from the separator to below the liquid level in the lower compartment.

11. Device as claimed in claim 1, wherein the inlet is connected to a pre-treatment unit for carrying out a first liquid/gas separation, which pre-treatment unit comprises an inlet cyclone separator arranged in the lower compartment.

12. Device as claimed in claim 1, wherein the liquid contains at least one of oil and water.

13. Device as claimed in claim 3, wherein a mesh is embodied to allow the supplied liquid to break through from a minimum K-value of about 0.1.

14. Device as claimed in claim 4, wherein a mesh is embodied to allow the supplied liquid to break through from a minimum K-value of about 0.1.

15. Device as claimed in claim 9, wherein the separator comprises one or more axial recycle cyclones, the liquid discharge of which extends from the separator to below the liquid level in the lower compartment.

16. Device for treating a gas/liquid mixture, comprising:
an upright vessel with a lower and upper compartment;
an inlet for admitting the flow of mixture into the lower compartment;
an agglomerating unit placed between the lower and upper compartment for enlarging the liquid droplets in the mixture;
a lower outlet for discharging the substantially liquid-containing mixture part from the lower compartment;
an upper outlet for discharging the substantially gas-containing mixture part from the upper compartment;
collecting means for collecting on the downstream side of the agglomerating unit liquid droplets which have broken through the agglomerating unit; and
recycling means for recycling the collected liquid to the lower compartment from the collecting means.

17. Device according to the claim 16, wherein the agglomerating unit comprises a wire mesh.

18. Device as claimed in claim 16, wherein the collecting means comprises at least one collecting reservoir extending in the agglomerating unit for collecting the broken-through liquid therein, and wherein the recycling means comprises a discharge conduit extending from the collecting reservoir to below the level of the liquid collected in the lower compartment.

19. Device as claimed in claim 16, wherein the collecting means are arranged over substantially 15% of the cross-section of the vessel.

20. Device as claimed in claim 16, wherein the liquid contains at least one of oil and water.

21. Method for treating a gas/liquid mixture in an upright vessel with a lower and upper compartment, comprising:
feeding the gas/liquid flow into the lower compartment of the vessel;
guiding the gas/liquid flow through an agglomerating unity arranged between the lower and upper compartment at high speed such that liquid breaks through to a position beyond the downstream surface of the agglomerating unit;
collecting the broken-through liquid;
recycling the collected liquid to the lower compartment;
guiding the mixture through a separator in the upper compartment for further separating the mixture into a substantially liquid-containing mixture part and a substantially gas-containing mixture part; and
discharging the mixture from the lower compartment and discharging the mixture from the upper compartment.

22. Method as claimed in claim 21, wherein a K-value of the supplied mixture amounts to at least 0.1.

23. Method as claimed in claim 21, further comprising further separating the mixture in the upper compartment by guiding the mixture through one or more cyclone separators and carrying the separated liquid part to the lower compartment and the separated gas part to the upper outlet.

24. Method as claimed in claim 21, further comprising pre-treating the introduced gas/liquid flow for separating a part of the liquid from the gas/liquid mixture, wherein the pretreatment comprises of guiding the introduced gas/liquid mixture through one or more inlet cyclones.

25. Method as claimed in claim 21, wherein the liquid contains at least one of oil and water.

26. Method for treating a gas/liquid mixture in an upright vessel with a lower and upper compartment, comprising: p1 feeding the gas/liquid flow into the lower compartment of the vessel;
guiding the gas/liquid flow through an agglomerating unit arranged between the lower and upper compartment at high speed such that liquid breaks through to a position beyond the downstream surface of the agglomerating unit;
collecting the broken-through liquid;
recycling the collected liquid to the lower compartment;
discharging the mixture from the lower compartment; and
discharging the mixture from the upper compartment.

27. Method as claimed in claim 26, wherein a K-value of the supplied mixture amounts to at least 0.1.

28. Method as claimed in claim 26, further comprising further separating the mixture in the upper compartment by guiding the mixture through one or more cyclone separators and carrying the separated liquid part to the lower compartment and the separated gas part to the upper outlet.

29. Method as claimed in claim 26, further comprising pre-treating the introduced gas/liquid flow for separating a part of the liquid from the gas/liquid mixture, wherein the pretreatment comprises of guiding the introduced gas/liquid mixture through one or more inlet cyclones.

30. Method as claimed in claim 26, wherein the liquid contains at least one of oil and water.

* * * * *